J. G. COLLINS.
WASHER FOR SOCKET BOLTS IN STEAM BOILERS.
No. 63,021. Patented Mar. 19, 1867.
Fig. 1.
Fig. 3.
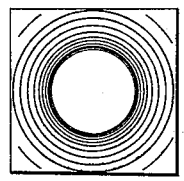
Fig. 4.
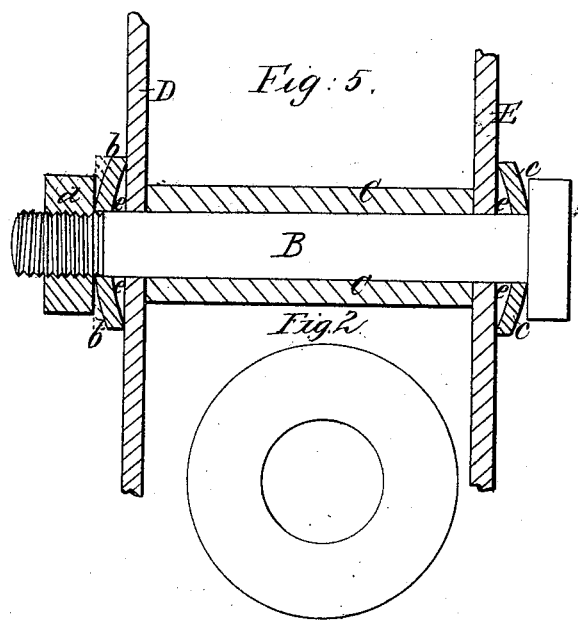
Fig. 5.
Fig. 2.
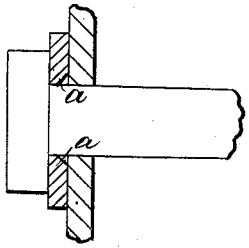
Fig. 6.
Witnesses;
John E. Crane
J. B. Samuels
Inventor;
Joseph. G. Collins

United States Patent Office.

JOSEPH G. COLLINS. OF BOSTON, MASSACHUSETTS.

Letters Patent No. 63,021, dated March 19, 1867

---

IMPROVED WASHER FOR SOCKET-BOLTS IN STEAM BOILERS.

---

The Schedule referred to in these Letters Patent and making part of the same.

---

TO ALL WHOM IT MAY CONCERN:

Be it known that I, JOSEPH G. COLLINS, of Boston, in the county of Suffolk, and State of Massachusetts, have invented a new and useful improvement in the Washers which are used on Socket-Bolts which pass through the water-legs, and other similar portions of Steam Boilers, of which the following is a full, clear, and exact description, reference being had to the accompanying drawings, making part of this specification, in which—

Figure 1 is a central section; and

Figure 2, a plan of one of my improved round washers.

Figures 3 and 4 are central sections and plan of one of my improved square or four sided washers.

Figure 5 shows two sections of boiler-plate with a socket-bolt and two of my improved washers applied thereto.

Figure 6 is a section of plate, washer, and bolt, as now in common use, and is drawn only to show the difference between it and my invention.

In the use of socket-bolts in water-legs, and other similar portions of steam boilers, it is necessary that the heads and nuts of such bolts should be packed in a suitable manner to prevent leakage between said bolts and the boiler-plate through which they pass.

To prevent such leakage, it is common to employ a flat washer which has had a portion of the metal removed from one side around the central hole, in the form of a countersink, as shown at $a$, in fig. 6. This countersink is filled with cement in a plastic state, which hardens by the application of heat; but as the countersink in the washer must be limited in capacity or size, it is difficult to apply the cement in a proper quantity and condition to make tight work, as the bolt-holes are frequently rough, ragged, full of splits, deep cracks, and scaly patches which prevent a small ring of cement having the desired effect; besides, the extra labor required to remove the metal and form the countersink in the washer renders said washers quite expensive.

In carrying out my invention, instead of removing a portion of the metal from a flat washer, I form the washer in the process of punching or casting, one side of said washer being concave and the other side convex, as shown in section in figs. 1, 3, and 5, and in some cases I flatten the convex side of the washer, as shown in red lines at $b$, in fig. 5.

It will, therefore, be readily seen that the outer edge only of the concave washers $b$ and $c$ comes in contact with the plates D and E, leaving a large space, $e$, between the washer and plate for the reception of cement, so that a sufficient quantity of cement may be used to make tight work under all circumstances.

The washers $b$ and $c$ should be of sufficient thickness to allow the nut $d$ on the bolt B to be screwed on far enough to bring the plates D and E firmly against the ends of the socket C and not cripple or crush the washer, and when great strain is required to bring the plates hard against the socket C, the convex side of the washer may be flattened, as at $b$, fig. 5; but the opposite side of the washer must be left concave for the reception of cement.

My improved concave washers for socket-bolts in steam boilers may be punched from plate iron, or they may be cast in malleable iron or other suitable metal. In either case only one operation is required to complete the construction or formation of said washer, thus rendering it much cheaper and a better packing arrangement than any washer heretofore used on socket-bolts in steam boilers.

I do not claim a countersunk flat washer for packing the socket-bolts in steam boilers, but I claim a washer constructed or formed substantially as herein shown and described for the purpose set forth.

JOSEPH G. COLLINS.

Witnesses:
JOHN E. CROWE,
J. B. SAMUELS.